Figure 1:
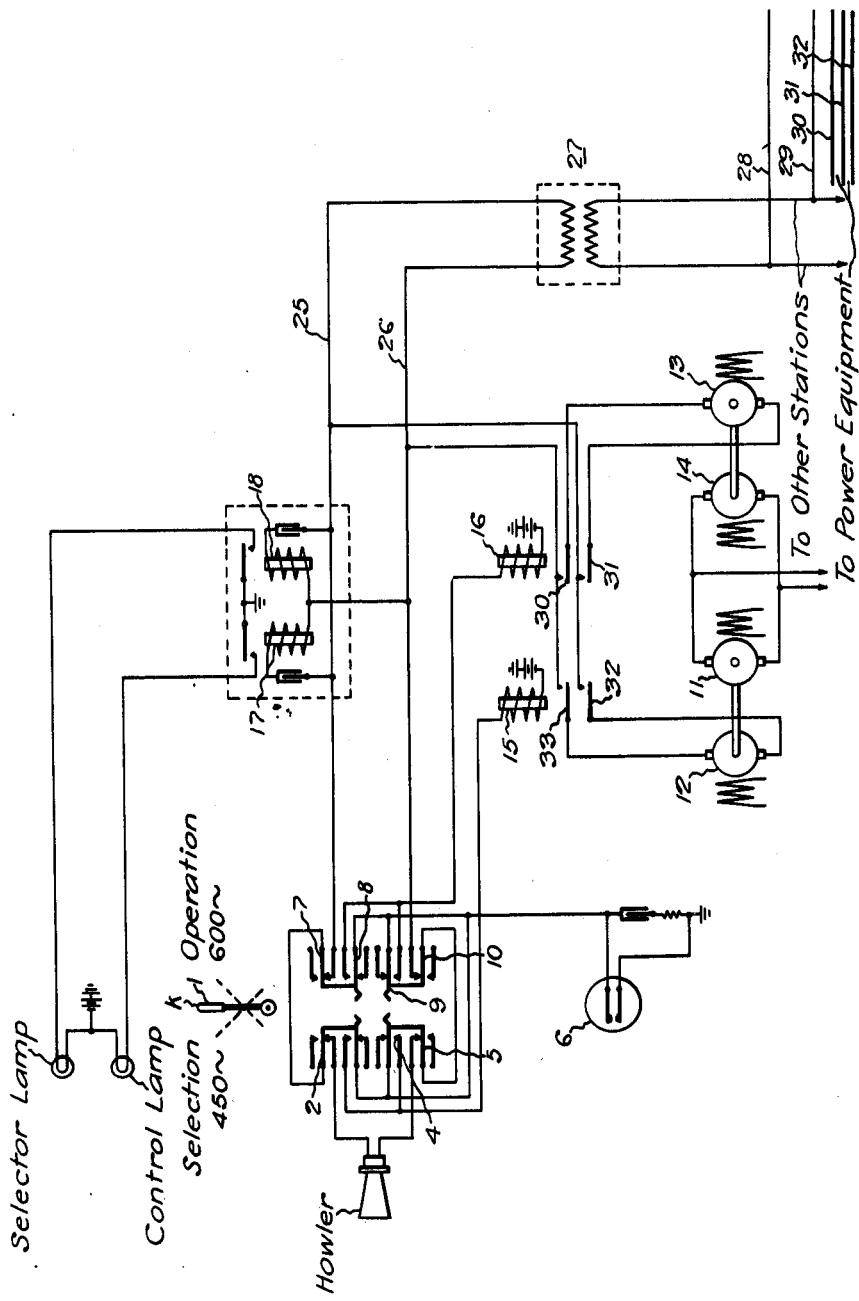

INVENTOR
Roy. J. Wensley

Patented Aug. 15, 1933

1,922,183

UNITED STATES PATENT OFFICE 1,922,183

SUPERVISORY CONTROL SYSTEM

Roy J. Wensley, Edgewood, Pa., assignor to Westinghouse Electric & Manufacturing Company, a Corporation of Pennsylvania Application August 14, 1926. Serial No. 129,166

4 Claims. (Cl. 179—78)

My invention relates to signalling systems, and particularly to supervisory control systems.

One object of my invention is to provide means for supervising and controlling apparatus units remotely untilizing the so-called ground of the power system for the signalling conductors.

Another object of my invention is to provide means for protecting supervisory apparatus from injury by reason of the influence of large amounts of energy.

Another object of my invention is to provide means for operating a supervisory control system over non-continuous signalling conductors.

Another object of my invention is to provide means for supervising, selecting and controlling apparatus units over two line wires employing alternating current for the signals.

There are other objects of my invention which, together with the foregoing, will appear in the specification which follows.

The signalling conductors which are to connect the supervisory control apparatus represents a substantial portion of the cost of a system. If no signalling conductors already connect the stations, the installation of a cable often renders the cost of supervisory control prohibitive. Under such conditions, the economics of the problem calls for some special arrangement.

One desirable means for overcoming this problem of the signalling conductor is to employ the ground conductors of a power system therefor. These ground conductors, which act as lighting protectors for the power lines and for providing a return path for ground currents when a phase line falls to earth so that the ground relays will function to sectionalize the line, are usually parts of the existing power system.

The necessity for, and the construction of, the ground conductors referred to will be obvious from a consideration of the Standard Handbook for Electrical Engineers, section 11, sub-sections 60 and 199.

In view of the fact, however, that these conductors are parallel, and are very close, to the power lines, they are subjected to heavy inductive surges. There is also the possibility that these ground conductors may accidentally drop upon, and short circuit, the power line.

In order to employ ground conductors for signalling purposes in supervisory control systems, it is, therefore, necessary to provide special means for protecting the apparatus units from the inductive surges and from the effects incident to accidental short circuiting of the power line.

My invention comprises arrangements for connecting the supervisory control apparatus to the ground conductors of a power system through transformers and employing protecting apparatus on the line side of the transformers to prevent any sudden large amount of power from entering the apparatus unit.

In order to render the apparatus unresponsive to the inductive surges, alternating current is used for both control and supervision, the receiving apparatus being placed in a circuit tuned to these frequencies. These alternating currents are sufficiently large in value to counteract the effect of noises produced in the ground by the adjoining power system.

Figure 2:
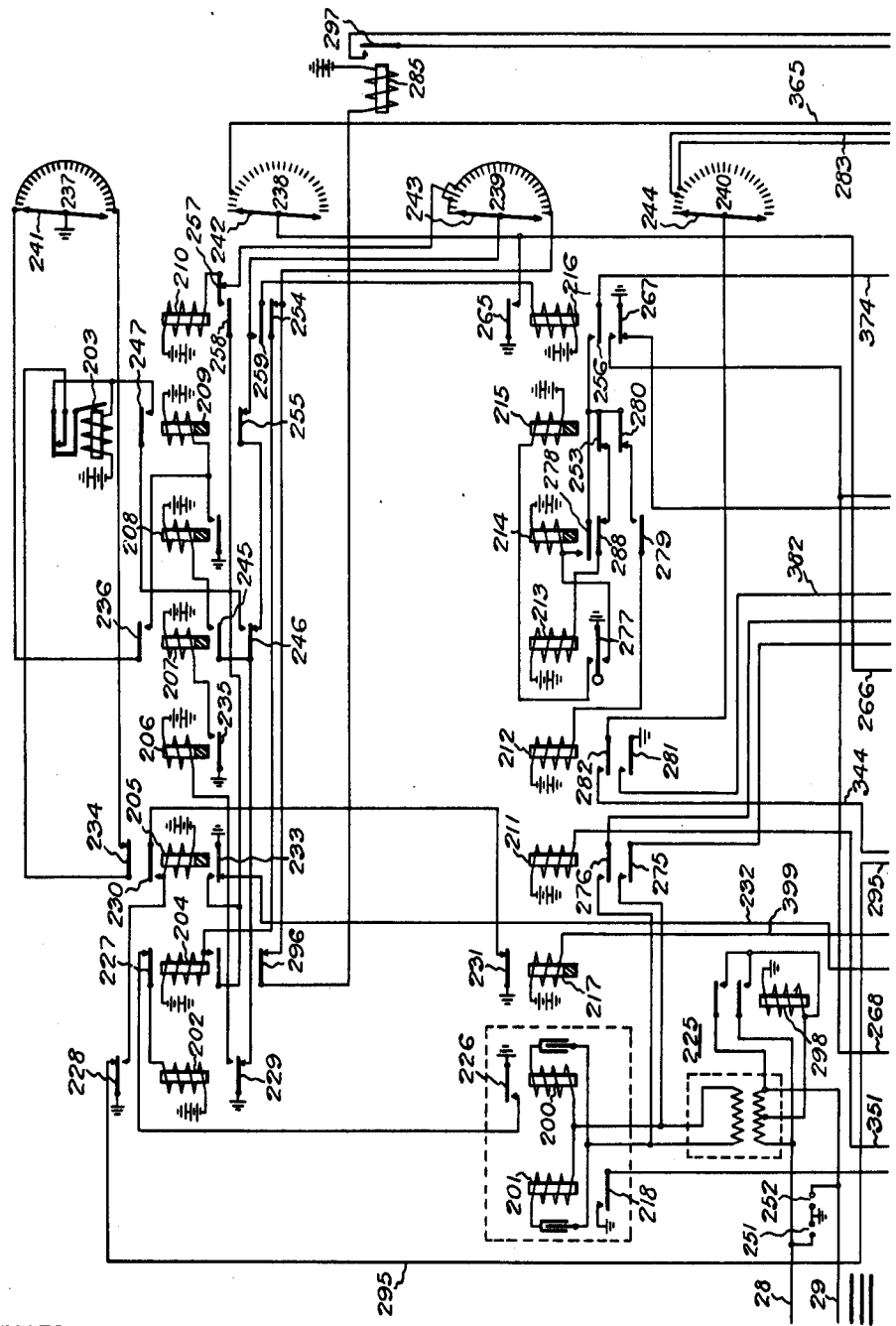
Figure 3:
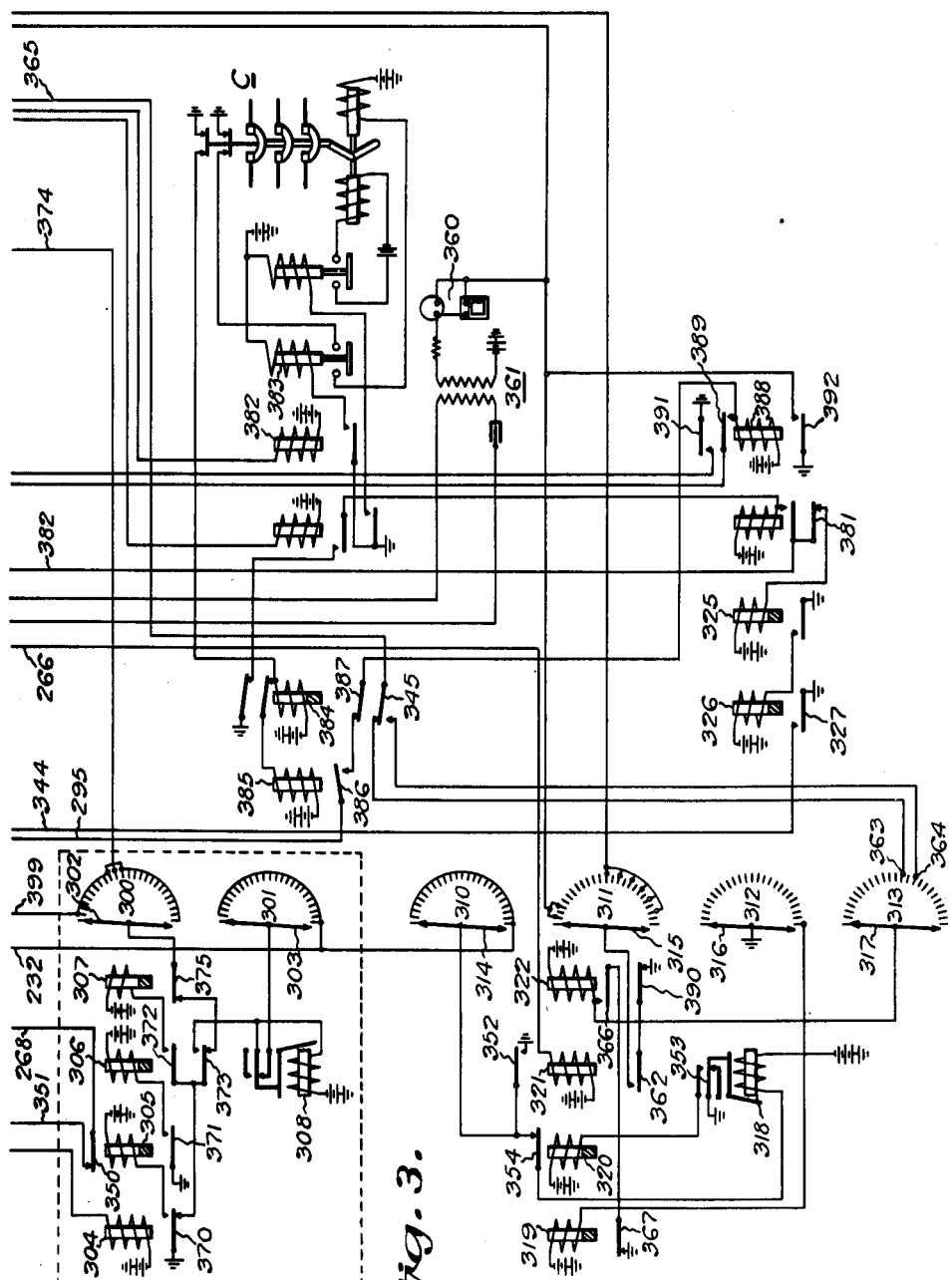

Referring to the drawings,

Figure 1 is a diagram of the apparatus and circuit arrangements at a dispatcher's office; and Figs. 2 and 3 are diagrams of the apparatus and circuit arrangements at a substation.

In practicing my invention, I provide a main station (Fig. 1) and a substation (Fig. 2) connected by power lines 30 to 32. Ground conductors 28 and 29 parallel the power lines for the purpose of functioning as protection therefor.

I have arranged to employ the ground conductors 28 and 29 as signalling conductors for performing the control and supervisory operations between the dispatcher's office (Fig. 1) and the substation (Fig. 2).

Because of the excessive inductive surges to which the ground conductors are subjected by reason of their closeness to the power conductors 30 to 32, the control supervisory apparatus cannot be directly connected to the signalling conductors 28 and 29, and I, therefore, provide transformers 27 and 225 between the signalling conductors and the apparatus units.

The use of transformers necessitates employing alternating currents for the signalling, and I, therefore, provide two sources of alternating currents, an alternator 13 for generating a voltage of 450 cycles, and an alternator 12 for generating a voltage of 600 cycles. Circuit arrangements are provided at the office whereby either the relay 16 or the relay 15 may be periodically energized to impress either the voltage of 450 cycles or the voltage of 600 cycles upon the signalling conductors 28 and 29.

At the receiving station (Fig. 2) circuits are provided whereby signals of the 450 cycle frequency function by operating the relay 200 to select one of a plurality of substations like that shown in Fig. 2, while signals of the 600 cycle frequency, by operating the relay 201, select a unit in the selected station. A buzzer 360 operates, following the selection of the station, to transmit signals of a predetermined frequency to the office for given an audible indication of the station selected, and operates responsive to the selection of a unit to again transmit signals of a predetermined frequency to the office for giving an audible indication of the unit selected.

Referring more particularly to Fig. 1, the generators 12 and 13 are actuated by motors 11 and 14 and are connected to a line which is controlled by a dial 6 and a key K. The key K, in its normal position, connects a howler to the signalling conductors. When moved to the right the key K connects the 600 cycle generator to the line and, when moved to the left, the 450 cycle generator is connected to the line by the energization of the relays 15 and 16, respectively. The selector and control lamp are simultaneously illuminated, with the impulsing under the control of relays 17 and 18, to give visual indication of the signal being transmitted. The apparatus unit at the office is connected to the ground conductors 28 and 29, which are now employed as the signalling lines, through the transformer 27.

Referring more particularly to Fig. 2, the substation apparatus is connected to the signalling conductors 28 and 29 through the transformer 225. A relay 200 is placed in a circuit tuned to the selecting frequency of 450 cycles and functions to repeat the selecting impulses received, to the relay 202 which, in turn, operates to energize the stepping magnet 203 of the wipers 241 to 244.

The relay 204 is energized at the completion of the station selecting impulses to render the relay 202 unresponsive to further selecting impulses, in the event that some station other than this particular one were selected by the first combination of impulses. Relay 204, it will be noted, is not energized if the station in which it is located is selected whereas the equivalent relays at all the other stations will operate.

Relay 205 operates to open the vibrating circuit of the stepping magnet 203 at armature 234 and to prepare a locking circuit for the relays 204 or 210 at armature 233. The relays 206 to 209 control the circuit of the stepping magnet.

Relay 210 is energized if the station, in which it is located, is selected by the first group of impulses, and prepares the station for the second group of impulses and for the operation of the supervisory signals which are to be transmitted to the office to indicate the station selected. Either relay 210 or relay 204 thus operates depending upon whether this is or is not the station selected by the first combinations of impulses.

Relay 216 operates in response to the operation of relay 210 to energize relay 321 which, completes an energizing circuit for the stepping magnet 318 and which, in turn, causes the energization of relay 320. In this manner the wipers 314 to 317 are stepped around for an indefinite period for transmitting supervisory indications of the station selected.

Relays 213 to 215 are operated after the final selection to prepare for closing the operating circuit of the selected unit and to restore the apparatus to normal. The relay 212 operates under the control of relays 213 to 215 to close the final operating circuit of the selected unit. Relay 211 connects the vibrator hereinafter mentioned, to the signalling conductors preparatory to the transmission of a code individual to the station selected. Relay 217 operates to release the apparatus units without operation after selection, if a code indicating such a desire is transmitted to the station by the dispatcher. Relay 201 is placed in a circuit tuned to the operating frequency of 600 cycles for operating the selected unit, in a manner to be hereinafter described.

Referring to Fig. 3, the wipers 314 to 317 are stepped under the control of relays 318 to 322 to control the transmission to the office of impulses generated by the vibrator 360, the code being individual to the station and unit selected. Relays 304 to 308 operate under the control of relay 201 to step the wipers 302 and 303 to either operate the selected apparatus unit or restore the selectors without operation. Relays 325 and 326 are energized to finally close the circuit of the selected unit, and relays 384 and 385 control the supervisory transmission of impulses.

Briefly, the operation is as follows. In order to operate an apparatus unit at the substation shown in Figs. 2 and 3, the dispatcher will first move his lever 1 to its left-hand position and operate the dial 6 to transmit three impulses. These three impulses, received at the substation, will cause the selector wipers 241 to 244 to be stepped to their third contact and will simultaneously cause the wipers at all the other substations connected to this line to be similarly stepped to their third contact.

At all of the substations, except the one disclosed in Figs. 2 and 3, the relay equivalent to 204 will be energized to render the relay equivalent to 202 ineffective for further impulsing by reason of the position of the switch wipers 241 to 244. At the station disclosed, however, relay 204 does not find an energizing circuit but, instead, the relay 210 is energized.

Following the station selection, the dispatcher will restore his lever 1 to its neutral middle position, connecting the howler to the signalling conductors. At the substation, following the selection of the station, the wipers 314 to 317 will be rotated step by step, causing a code of three impulses to be transmitted to the office to operate the howler. This operation will continue indefinitely so long as the howler is connected to the line, and the dispatcher will thus be appraised of the station selected.

He will then again operate his lever 1 to its left-hand position and operate the dial 6 to transmit one more impulse, thereby stepping the wipers 241 to 244 to their fourth contact and making a final or unit selection. The dispatcher will now again restore the lever 1 to its neutral middle position, again connecting the howler device to the line, while, at the substation, the wipers 314 to 317 will rotate to transmit combinations of impulses generated by the vibrator 360 individual to the station and unit selected. These impulses will operate the howler to give an audible indication to the dispatcher of the station and unit selected and, as before, this operation continues indefinitely.

The dispatcher will now operate his lever 1 to its right-hand position, connecting the 600 cycle generator to the line to again operate the dial 6 to transmit ten impulses. The impulses will now operate the relay 201, which, in turn, controls the relay 304. The wipers 302 and 303 will be stepped from contact to contact until the tenth contact is reached, at which point a control operation completes the selected circuit of the circuit breaker. The circuit breaker is thereupon operated and the dispatcher again turns his key to its middle or neutral position. Audible indications are thereupon received of the operation of the unit.

In order to better understand the invention, the details of the operations will now be described. It will be assumed that the dispatcher desires to open the circuit breaker C, which is shown closed at the substation disclosed in Figs. 2 and 3. In order to perform this, the dispatcher will first operate the lever arm 1 to its left-hand position, thereby moving the switch members 7 and 8 into engagement with their upper contacts and members 9 and 10 into engagement with their lower contacts. He will then operate the dial 6 three times.

Upon the closing of the contacts of dial 6, the relay 16 will be energized over a circuit from ground through the contacts of dial 6, the lever 9 and its lower contact, winding of relay 16 and battery to ground. The energization of the relay 16 connects the generator 13 across the conductors 26 and 25 through armatures 30 and 31. An alternating-current voltage of 450 cycles is impressed upon the conductors 25 and 26 and is transmitted, through the transformer 27, to the conductors 28 and 29, over the line and through the transformer 225 at the substation to operate the relay 200 which is placed in a circuit tuned to 450 cycles.

A relay 200 operates to complete an energizing circuit for a relay 202 over its armature 226 and its front contact and back contact and armature 227. The relay 202 is energized to complete an energizing circuit for a relay 206 at armature 229 and its front contact and to complete an energizing circuit for a relay 205 at armature 228 and its front contact. The relay 206 completes an energizing circuit for a relay 207 at armature 235.

The relay 205, when energized, completes a locking circuit for itself at armatures 230 and 231, opens the vibrating circuit of the stepping magnet 203 at armature 234, opens the circuit of the stepping magnets 318 and 308 at armature 233 and its back contact and prepares a locking circuit for the relays 204 and 210 at armature 233 and its front contact.

The relay 206 is energized to compelte an energizing circuit for the relay 207 at armature 235. The relay 207 is energized to prepare an energizing circuit for the relay 208 at armature 245, to prepare the stepping magnet circuit at armature 246 and to complete an energizing circuit for the relay 209 at armature 236. The relay 209 is energized to further prepare the stepping magnet circuit at armature 247 and to hold open the energizing circuit of the station selecting relay 210 at armature 255.

Simultaneously with the energization of the relay 200 and upon the impression of the 450 cycles upon the conductors 25 and 26, the relay 17, which is in a circuit tuned to this frequency, is also energized to complete an obvious energizing circuit for the control lamp. This lamp serves to indicate to the dispatcher the correct transmission of the impulses.

As stated before, the dispatcher will operate the dial 6 to open and close its contacts three times. Upon the opening of the dial after the first closing, the relay 16 is deenergized to disconnect the generator 13 from the conductors 25 and 26. The alternating-current relay 200 is deenergized when the alternating-current voltage is removed from the conductors 28 and 29 and, in turn, opens the energizing circuit of the relay 202 at armature 226.

Deenergization of the relay 202 opens the energizing circuit of the relays 205 and 206 at the armatures 228 and 229, respectively, but, since these relays are slow to release, they will not be deenergized during the short interval between the impulsing. A circuit is now completed for the relay 208 from ground over armature 229 and its back contact, armature 245 and its front contact, winding of relay 208 and battery to ground.

Relay 208 is energized over this circuit to complete an obvious energizing circuit for the relay 209 which is thereafter maintained energized independently of the position of the wiper 241. A circuit is also completed for the stepping magnet 203 from ground over armature 229 and its back contact, armature 246 and its front contact, armature 247 and its front contact, the winding of stepping magnet 203 and the battery to ground.

Stepping magnet 203, when thus energized, operates its pawl preparatory to stepping the switch wipers 241 to 244 from their first to their second contacts. The dial contact 6 will now be closed a second time to again energize the relay 16. The second impulse will energize the relay 202, in the manner already described in connection with the first impulse, to again close energizing circuits for the relays 205 and 206 over armatures 228 and 229, respectively, but, since these relays are already energized, no additional function is performed.

The circuit of the stepping magnet 203 is opened at armature 229, and the stepping magnet is deenergized. The deenergization of the relay 203 operates its pawl to step the wipers 241 to 244 from their first to their second switch contact. At the completion of the second impulse, relay 202 is again deenergized and again completes an energizing circuit for the stepping magnet 203 at armature 229 and its back contact. Upon the receipt of the third impulse, relay 202 is again energized to open the energizing circuit of the stepping magnet 203, and the wipers are stepped from their second to their third contact.

At the end of the third impulse, relay 202 is deenergized to again energize stepping magnet 203. The dispatcher will now operate his lever 1 to its middle normal position, connecting the howler across the line conductors 25 and 26.

Upon the deenergization of the relay 202 at the substation at the end of the third impulse, the circuit for the relay 206 is opened at armature 229. Relay 206, being a slow-release relay, is deenergized after an interval of time to, in turn, open the energizing circuit for the relay 207. The relay 207 is deenergized after an interval of time to open the energizing circuit of the relay 208 at armature 245 and the energizing circuit of the stepping magnet 203 at armature 246. The wipers are now stepped from their third to their fourth contacts.

Relay 208 deenergizes after an interval of time to open the energizing circuit of the relay 209. The relay 209 is deenergized after an interval of time and a circuit is now completed from ground through armature 229 and its back contact, armature 246 and its back contact, armature 255 and its back contact, the wiper 243, fourth contact of the switch 239, the make-before-break contact 257, winding of relay 210 and battery to ground.

The relay 210 is energized and completes a locking circuit for itself over front contact and armature 258 and front contact and armature 233 to ground. A further result of the energization of the relay 210 is to complete an energizing circuit for the relay 216 from ground over armature 229 and its back contact, armature 246 and its back contact, armature 255 and its back contact, the front contact and armature 259, winding of relay 216 and battery to ground and to open a possible energizing circuit for the relay 204 at armature 254.

Since the relay 210 has been energized, indicative that this station has been selected, it is necessary to prevent any accidental energization of the relay 204 which would, in turn, render the relay 202 unresponsive to the line impulses. This is effected by the opening of the energizing circuit of the relay 204 at armature 254.

The relay 216, when energized, completes an energizing circuit for the relay 211 from ground over armature 267 and its front contact, conductor 268, armature 350 and its back contact, conductor 351 and winding of relay 211 and battery to ground. Relay 211 is energized to connect the vibrator circuit across the conductors 28 and 29 of transformer 225. A further result of the energization of relay 216 is to complete an energizing circuit for the relay 321 from ground over armature 265 and its front contact, conductor 266, winding of relay 321 and battery to ground.

The relay 321 operates to complete an energizing circuit for the stepping magnet 318 over armatures 352 and 354. The stepping magnet 318 energizes to prepare its pawl to step the wipers 314 to 317 from their first to their second contacts and to complete an energizing circuit for the relay 320 and its armature contact 353.

The relay 320 is energized to open the original energizing circuit of the stepping magnet 318 at armature 354. The stepping magnet is deenergized to operate its pawl, thereby stepping the switch wipers from their first to their second contact and opening the energizing circuit of the relay 320 at armature contact 353.

After an interval of time, the slow-release relay 320 deenergizes and again closes an energizing circuit for the stepping magnet 318. In this manner, the stepping magnet is periodically energized and deenergized to step the wipers from contact to contact. Upon reaching the second contact, the circuit of the buzzer 360 is completed from ground to battery, primary of the transformer 361, through the buzzer 360, the second contact of the switch 311 and its wiper 315, the front contact and armature 362 and armature 390 and its back contact to ground.

An alternating-current voltage is thus set up in the secondary winding of the transformer 361 which is impressed upon the station side of the transformer 225 through the closed armature contacts 275 and 276. The alternating-current voltage generated by the buzzer causes a current to be transmitted through the conductors 28 and 29 and over the conductors 25 and 26, from line 25 through lower contact and switch arm 7, switch arm 2 and its lower contact, the howler device, the upper contact and switch arm 5, the switch arm 10 and its upper contact to line 26.

An audible indication is thus given at the dispatcher's office. As the switch wiper 315 passes from its second to its third contact, the circuit for the buzzer is opened and again completed when it reaches the third contact. Two tones are thus received at the office end and this code of two impulses being individual to the particular substation selected, the dispatcher is thus advised of the correct selection. The switch wiper 315 continues to move indefinitely.

After being informed, however, of the correct selection by the audible code, the dispatcher will again move his switch lever 1 to its left-hand position and operate the dial to transmit one more impulse. The 450 cycle voltage will be impressed upon the line to operate the relay 200 in the manner already described in the case of station selection.

The energization of the relay 200 completes an energizing circuit for the relay 202 and the relays 205 to 207 are energized in the manner already described. Upon the completion of the first impulse, relay 202 is deenergized and completes an energizing circuit for the relays 208, 209 and the stepping magnet 203 in the manner already described. After an interval of time, however, relay 206 deenergizes followed by the deenergization of relays 207—209 and the stepping magnet 203.

The relay 285 will now be energized over a circuit from ground through battery, winding of relay 285, the armature 296 and its back contact, fifth contact and the switch wiper 243, back contact and armature 255, back contact and armature 246 and back contact and armature 229 to ground.

The dispatcher will now again operate his switch lever 1 to its middle position, again connecting the howler device to the conductors 25 and 26. As the switch wiper 315 is stepped from contact to contact in a manner already described, it will first transmit two impulses and then, upon reaching its thirteenth contact, will again complete an energizing circuit for the buzzer 360 over a circuit from ground to battery, the primary of the transformer 361, the buzzer 360, armature 297, and its front contact, the thirteenth contact of switch 311, wiper 315, front contact and armature 362 and armature 390 to ground.

This same circuit will be repeated in the 17th, 19th, 21st and 23rd contacts. Six impulses will thus be transmitted to the office indicative of the unit selected. Having been informed of the correct selection of the station and unit, the dispatcher will now operate his lever arm 1 to its right-hand position and close an energizing circuit for the relay 15. Upon the operation of the dial 6 a circuit is completed from ground through the contacts of the dial 6, the switch lever 5 and its lower contact 4 winding of relay 15 and battery to ground.

The energization of relay 15 connects the 600 cycle generator 12 across the conductors 25 and 26 over the armature contacts 32 and 33. In order to operate the selected unit, the dispatcher will operate the dial to transmit ten impulses. These impulses received at the substation end will energize the alternating-current relay 201, which is placed in a circuit tuned to a frequency of 600 cycles.

The energization of the relay 201 completes an energizing circuit for the relay 304 over armature 218. The energization of relay 304 completes an obvious energizing circuit for the relay 305 which, in turn, opens the energizing circuit of the relay 211 at armature 350 and closes an energizing circuit for the relay 306 at armature 371.

The deenergization of the relay 211 disconnects the buzzer from the signalling lines at the armatures 275 and 276 so as to keep the supervisory signals off the line during the control operation. The energization of the relay 306 prepares an energizing circuit for the relay 307 at armature 372 and an energizing circuit for the stepping magnet 308 at armature 373.

Upon the completion of the first impulse, the armature 370 drops to its back position, opening the energizing circuit for the relay 305 and completes energizing circuits for the relay 307 and stepping magnet 308. Relay 305 being a slow-release relay is not deenergized during the short intervals between pulses, during which the circuit is opened.

The relay 307 energizes to open the operating circuit of the selected unit at armature 375, thereby preventing any operation until the correct number of impulses have been received. The stepping magnet 308 operates the switch wipers from their first to their second contact.

As the impulses are now received periodically, relay 304 energizes and deenergizes to periodically energize and deenergize the stepping magnet 308, which, in turn, steps the wipers from contact to contact. Relays 305 to 307 being slow to release, do not follow this periodic energization and deenergization, but instead remain energized.

At the end of the tenth impulse, a sufficiently long pause occurs to enable the slow-release relay 305 to deenergize. Relay 305 deenergizes to again close the energizing circuit of the relay 211 at armature 350 and to open the energizing circuit for the relay 306 at armature 371.

Relay 306 is deenergized to open the circuit of the relay 307 at armature 372 and the circuit of the stepping magnet 308 at armature 373 and the wipers are stepped from their ninth to their tenth contact. The relay 307 deenergizes after an interval of time to permit its armature to drop to its back position and a circuit is completed for the intermediate relay from ground over armature 370 and its back contact, armature 373 and is back contact, back contact and armature 375, the wiper 302, the tenth contact of the switch 300, conductor 374, armature 256 and its front contact, armature 253 and its back contact, back contact and armature 288, winding of relay 213 and battery to ground.

The armature 277 of the relay 213 is of the wiggle-tail type. It is so designed that, upon deenergization of the relay, it will vibrate for a predetermined length of time between its upper and lower contacts and in contact with each other. The relay 213 now energizes over the circuit just traced and completes an energizing circuit for the relay 215 over its armature 277 and its front contact.

Relay 215 energizes to open the energizing circuit of the relay 213 at armature 253 and to open the energizing circuit for the relay 212 at armature 280. The relay 213 deenergizes and its wiggle-tail armature vibrates between its front and back contact. As its front contact, it completes an energizing circuit for the relay 215 and at its back contact an energizing circuit for the relay 214.

The relay 214 is energized and completes a locking circuit for itself from ground through battery, winding of relay 214, front contact and armature 278, the front contact and armature 256, conductor 374, the eleventh contact of the switch 300, wiper 302, armature 375, and its back contact, back contact and armature 373, back contact and armature 370 to ground, opens a further point in the energizing circuit of the relay 213 at armature 288 and prepares an energizing circuit for the relay 212 at armature 279.

After an interval of time, the wiggle-tail armature 277 comes to rest at its mid point and the energizing circuit of the relay 215 is opened. Slow-release relay 215 deenergizes after an interval of time and completes an energizing circuit for the relay 212 at armature 280 from ground through battery, winding of relay 212, armature 279 and its front contact, back contact and armature 280, front contact and armature 256, conductor 374, the eleventh contact of the switch 300, wiper 302, armature 375 and its back contact, back contact and armature 373 and back contact and armature 370 to ground.

The relay 212 energizes over the circuit just traced and completes an energizing circuit for the relay 325 from ground through battery, winding of relay 325, back contact and armature 381, conductor 382, the front contact and armature 281 to ground.

Relay 325 is energized to complete an energizing circuit for the relay 326. Relay 326 is energized to complete an energizing circuit for the intermediate relay of the circuit breaker from ground over armature 327 and its front contact, conductor 344, front contact and armature 282, the wiper 244, the fourth contact of the switch 240, conductor 283 winding of relay 382 and battery to ground.

Relay 382 completes an obvious energizing circuit for the solenoid 383 at its armature contact. The solenoid 383 energizes to complete an obvious energizing circuit for the relay 384 over the contacts of the solenoid and of the pallet switch. The energization of the relay 384 opens the latch of the circuit breaker to permit the circuit breaker to drop to its back position.

The opening of the circuit breaker opens the energizing circuits of the relays 384 and 385 at the upper contacts of the pallet switch. The relay 384 being slow to release, relay 385 will deenergize before the former and an energizing circuit will be completed for the relay 388 from ground through battery, winding of the relay 388, armature 387 and its front contact, back contact and armature 386, conductor 295, back contact and armature 228 to ground.

The energization of relay 388 has no particular function at this time, although, had the circuit breaker been automatically operated, relay 388 would have been energized and locked to transmit a tone to the substation to indicate to the dispatcher that an apparatus has operated. After an interval of time, the relay 384 deenergizes and opens the energizing circuit of the relay 388 at armature 387.

During this period the switch wipers 314 to 317 continue to be stepped from contact to contact by the periodic energizing and deenergizing of the relay 318 in a manner as already described. When the wiper 317 reaches the contact 364 the relay 322 is energized over a circuit from ground through battery, the winding of relay 322, wiper 317, contact 364 of the switch 313, the back contact and armature 345, conductor 365, the 4th contact of the switch 238, wiper 242 and front contact and armature 265 to ground. The relay 322 is energized over this circuit and locks itself over its armature 366 and armature 367. A further result of the energization of the relay 322 is to open the energizing circuit of the buzzer 360 at armature 390. Since this occurs at the 17th point or the 3rd impulse of the second group transmitted, the code is changed from two impulses in the first group and one impulse in the second group to two impulses in the first group and two in the second group.

As the switch wipers 314 to 317 continue to step from contact to contact no further tones are transmitted over the line in view of the fact the buzzer circuit remains open at armature 390. As the wiper 316 reaches the last contact, an obvious energizing circuit is completed for the relay 319 thereby opening the locking circuit of the relay 322 at armature 367. The wipers 314 to 317 now reach the first contact and repeat the cycles. The relay 322 is again energized when the wiper 317 reaches the contact 364. The dispatcher at the office is thus informed of the operation of the apparatus unit.

It will be noted, of course, that the energization of relay 322 which determines a number of tones transmitted at the second group depends upon whether its circuit is completed at contact 363 or 364 for the circuit breaker C. Similarly, other contacts on the switch 313 are connected to open and closed points of other circuit breakers, thus producing a supervisory code individual to each apparatus unit. After the dispatcher has been informed of the completion of the operation in accordance with the code dialed, he will again switch his lever 1 to connect the 600-cycle generator across the line. As a result the relay 201 will be energized in a manner described, and, in turn, will energize relay 304. Relay 304 will, in turn, energize relay 305 and relays 306 and 307 will energize in a manner already described. The energization of relay 306 prepares an energizing circuit for the stepping magnet 308 at armature 373 and its front contact.

Upon the completion of the first impulse, the relay 304 is energized and an energizing circuit is completed for the stepping magnet 308 from ground over armature 370 and its back contact, armature 373 and is front contact, winding of the stepping magnet 308 and battery to ground. The stepping magnet 308 is energized over the circuit and steps the wipers 302 and 303 from their 11th to their 12th contact. After an interval of time, the relay 305 becomes deenergized to in turn deenergize the relays 306 and 307.

Upon the deenergization of relay 307 an energizing circuit is completed for the relay 217 from ground over armature 370 and its back contact, armature 373 and its back contact, the back contact and armature 375, the wiper 302 and the 12th contact of the switch 300, conductor 399, winding of relay 217 and battery to ground. The relay 217 is energized over this circuit and opens the locking circuit of the relay 205 at the armature 231. The relay 205 is thus deenergized, and after an interval of time, permits its armature to drop to its back position.

The locking circuit of the relay 210 is thus deenergized at the armature contact 233. Deenergization of the relay 210 opens the energizing circuit of the relay 216 at the armature 259.

As a result no further supervisory tones can therefore be transmitted over the line. At the back contact of armature 267 a locking circuit is prepared for relay 388. The energizing circuit of the relay 321 and the relay 322 is opened at the armature 265 and its front contact. The locking circuit of the relay 214 is opened at armature 256 to in turn open the energizing circuit of the relay 212 at armature 279.

A vibrating circuit is now completed for the stepping magnets 308 and 318. In the case of the stepping magnet 308, this circuit is completed from ground through battery, winding of the stepping magnet 308, the wiper 303 of switch 301, the 11th contact conductor 232, and back contact and armature 233 to ground. In the case of the stepping magnet 318, the circuit is completed from ground through battery, winding of stepping magnet 318, the armature 354 and its back contact, switch wiper 314, over conductor 232, back contact and armature 233 to ground. The stepping magnet 308 is thus periodically energized and deenergized by the opening of its contact, in order to step the wipers 302 and 303 from contact to contact until restored to normal at their first contact, at which point relay 308 no longer obtains an energizing circuit.

The energization of the stepping magnet 318 completes the energizing circuit for the slow-release relay 320 and these two function in interrelated manner to periodically energize and deenergize the stepping magnet 318 until the wipers 314 to 317 are restored to their first contact, at which point no further energizing circuit for the stepping magnet 318 is complete. In this manner, the apparatus is restored to normal, after the completion of the operation.

In case the circuit breaker operates automatically, the dispatcher will receive a buzz indicating that something has happened at the substation end and he will thereafter dial to the various apparatus units until the supervisory circuit indicates that he has reached the unit which has changed its position. This is accomplished as follows:

It will be assumed that the circuit breaker, which is shown closed, automatically opens. As a result of the opening of the circuit breaker, the energizing circuits for the relays 384 and 385 are opened at the upper contact of the pallet switch. Relay 384, being a slow release relay, will not permit its armature to drop to its back position as fast as the armature contact of relay 385 drops back.

As a result, an energizing circuit is completed from the relay 388, from ground to battery, winding of relay 388, armature 387 and front contact, back contact and armature 386, conductor 295 and back contact and armature 228 to ground. The relay 388 is energized over the circuit and completes a locking circuit for itself at armature 389, from ground through battery, winding of relay 388, to front contact and armature 389, back contact and armature 267 to ground, completes an energizing circuit over armature 391 and its front contact, armature 350 and its back contact, conductor 351, winding of relay 211 and battery to ground.

Relay 211 is energized over this circuit and closes its armature contacts 275 and 276 to connect the buzzer 360 across the line. Simultaneously, an energizing circuit is completed for the buzzer 360 at armature 392 and its front contact.

At the substation end, the howler device is normally connected in a circuit in the manner already described so that the dispatcher is immediately apprised of the fact that some operation has been performed at the substation. He will now operate his dial and lever 1 in the manner already described until, upon reaching the correct unit which has operated the supervisory circuit individual thereto, indicates that the circuit breaker is open.

It will be recalled that the conductors 28 and 29 are the ground conductors of the power system and that, due to the possibilities of crossing the power line, the supervisory apparatus must be protected. This is accomplished by the relay 298 shown connected to the mid-point of the primary circuit of the transformer at the substation end. This relay is designed to operate on 75 amperes. As shown, the winding of relay 298 is connected between ground and the mid-point of the primary winding of the connecting transformer 225.

As will be readily understood, should the ground conductors 28 and 29 accidentally come into contact with the power lines 30, 31 and 32 so as to cause a very high surge current to flow therein, or should a heavy surge current be induced in the ground conductors from the power lines, the connection of the winding of relay 298 provides a circuit to conduct such current to ground, that is, any surge current flowing in the ground conductors flows through the primary winding of the transformer 225 and the coil of relay 298 to ground.

In the event that the surge current, which flows in the above-described circuit, exceeds that which is necessary to operate relay 298, which, in this instance, is 75 amperes, the relay is operated to close its contact members which are so connected to the opposite ends and to the mid-point of the transformer primary that this winding is shunted and, therefore, the transformer 225 becomes ineffective as an electrical connection between the ground conductors and the selecting apparatus at the second station.

As will be readily understood, the relay 298 will remain closed until the surge current decreases to a value which is not sufficient to operate the relay, when its contact members will open to again render the transformer 225 effective.

As a further protection, the two gaps 251 and 252 are connected across the conductors 28 and 29 and grounded to act as a leak path should a surge sufficiently large to jump this gap be impressed on the conductors.

By the arrangement of these protective devices and by a special arrangement of a non-continuous conductor, it becomes possible to make additional use of the ground wires of the power line as herein-described.

Although my invention is disclosed in connection with a supervisory control system, it is obvious that it has other applications, and I do not intend to limit myself to the specific application described except insofar as set forth in the appended claims.

I claim as my invention:

1. A communication system comprising transmission line conductors, a translating device relatively connected thereto, a winding extending between the transmission line conductors and having a neutral point connected to ground thus providing a path for draining extraneous current in the said communication system to ground, and an electromagnetic means serially connected in the said path and adapted to operate automatically suitably arranged contacts for connecting to ground, both extremities of the said winding having a neutral point, when extraneous current in the communication system exceeds a predetermined degree and for disconnecting both extremities of the said winding from ground when the extraneous current subsides.

2. A communication system comprising transmission line conductors, a translating device adapted to be connected to said line conductors, a transformer connected between said device and said line conductors, said transformer having its primary winding connected between the line conductors, an electromagnet having its coil connected between ground and the mid-point of the transformer primary winding, and contact means actuated by the electro-magnet in response to the flow of a predetermined amount of extraneous current through the coil of the electro-magnet for connecting both ends of the primary winding to ground through the coil of the electro-magnet.

3. A communication system comprising transmission line conductors, a translating device adapted to be connected to said line conductors, a transformer connected between said device and said line conductors, said transformer having its primary winding connected between the line conductors, and a relay having its operating coil connected between ground and the mid-point of the primary winding whereby extraneous current may be drained from the line conductors through said coil, said relay being operable in response to a predetermined flow of said extraneous current to connect both ends of the primary winding to ground until the flow of extraneous current subsides below said predetermined value.

4. A communication system comprising transmission line conductors, a translating device adapted to be connected to said line conductors, a transformer connected between said device and said line conductors, said transformer having its primary winding connected between the line conductors, an electro-magnet having its coil connected between ground and the mid-point of the transformer primary winding, and contact members actuated by the electro-magnet in response to the flow of a predetermined amount of extraneous current in the communication system, for short circuiting the primary winding of the transformer and connecting the ends thereof to ground.

ROY J. WENSLEY.